(12) United States Patent
Zhao et al.

(10) Patent No.: US 12,452,407 B2
(45) Date of Patent: Oct. 21, 2025

(54) COMPOUND INTER-INTRA PREDICTION MODES

(71) Applicant: TENCENT AMERICA LLC, Palo Alto, CA (US)

(72) Inventors: Xin Zhao, San Jose, CA (US); Madhu Peringassery Krishnan, Mountain View, CA (US); Liang Zhao, Sunnyvale, CA (US); Shan Liu, San Jose, CA (US)

(73) Assignee: TENCENT AMERICA LLC, Palo Alto, CA (US)

(*) Notice: Subject to any disclaimer, the term of this patent is extended or adjusted under 35 U.S.C. 154(b) by 230 days.

(21) Appl. No.: 17/983,041

(22) Filed: Nov. 8, 2022

(65) Prior Publication Data

US 2023/0283767 A1    Sep. 7, 2023

Related U.S. Application Data

(60) Provisional application No. 63/316,819, filed on Mar. 4, 2022.

(51) Int. Cl.
| | |
|---|---|
| *H04N 19/105* | (2014.01) |
| *H04N 19/132* | (2014.01) |
| *H04N 19/159* | (2014.01) |
| *H04N 19/176* | (2014.01) |
| *H04N 19/126* | (2014.01) |
| *H04N 19/503* | (2014.01) |

(Continued)

(52) U.S. Cl.
CPC ......... *H04N 19/105* (2014.11); *H04N 19/132* (2014.11); *H04N 19/159* (2014.11); *H04N 19/176* (2014.11); *H04N 19/126* (2014.11); *H04N 19/503* (2014.11); *H04N 19/59* (2014.11); *H04N 19/593* (2014.11)

(58) Field of Classification Search
CPC .. H04N 19/105; H04N 19/132; H04N 19/159; H04N 19/176; H04N 19/154; H04N 19/46; H04N 19/157; H04N 19/70
See application file for complete search history.

(56) References Cited

U.S. PATENT DOCUMENTS

| | | | | |
|---|---|---|---|---|
| 2020/0162737 | A1* | 5/2020 | Van der Auwera | .... H04N 19/82 |
| 2021/0281833 | A1* | 9/2021 | Heo | ...................... H04N 19/176 |

(Continued)

OTHER PUBLICATIONS

International Search Report dated Mar. 8, 2023, issued in International Application No. PCT/US2022/049784.

(Continued)

*Primary Examiner* — Richard T Torrente
(74) *Attorney, Agent, or Firm* — Sughrue Mion, PLLC

(57) ABSTRACT

A method for applying adaptive weightings on intra prediction and inter prediction parts in compound inter-intra prediction modes includes defining a template area of neighboring reconstruction or prediction samples, applying one or more adaptive weighting candidates to the template area to generate one or more prediction samples using compound inter-intra prediction, calculating a cost value for each of the one or more adaptive weighting candidates, selecting the adaptive weighting candidate that provides the lowest cost as the weighting used for decoding a block with compound inter-intra prediction mode, and decoding the block based on the selected adaptive weighting.

18 Claims, 12 Drawing Sheets

(51) Int. Cl.
  *H04N 19/59* (2014.01)
  *H04N 19/593* (2014.01)

(56) References Cited

U.S. PATENT DOCUMENTS

2023/0048262 A1* 2/2023 Sim .................. H04N 19/86
2023/0049912 A1* 2/2023 Lee .................. H04N 19/132
2023/0353773 A1* 11/2023 Moon ................ H04N 19/176

OTHER PUBLICATIONS

Written Opinion dated Mar. 8, 2023, issued in International Application No. PCT/US2022/049784.

* cited by examiner

| interintra_mode | Name of interintra_mode |
|---|---|
| 0 | II_DC_PRED |
| 1 | II_V_PRED |
| 2 | II_H_PRED |
| 3 | II_SMOOTH_PRED |

| | | | | | | | | |
|---|---|---|---|---|---|---|---|---|
| 3 | 3.2◻ | 1 | 6◻ | 8◻ | 4◻ | 2◻ | 1◻ | ◻ |
| 3 | 3.3◻ | 1 | 7◻ | 9◻ | 4◻ | 2◻ | 1◻ | ◻ |
| 3 | 3.4◻ | 1 | 8◻ | 9◻ | 5◻ | 2◻ | 1◻ | ◻ |
| 3 | 3.5◻ | 1 | 8◻ | 9◻ | 5◻ | 2◻ | 1◻ | ◻ |
| 3 | 3.7◻ | 1 | 9◻ | 1.0◻ | 5◻ | 3◻ | 1◻ | ◻ |
| 3 | 3.8◻ | 1 | 9◻ | 1.0◻ | 5◻ | 3◻ | 1◻ | 1◻ |
| 3 | 3.9◻ | 2 | 1.0◻ | 1.0◻ | 5◻ | 3◻ | 1◻ | 1◻ |
| 4 | 1.1◻ | 2 | 1.0◻ | 1.1◻ | 6◻ | 3◻ | 1◻ | 1◻ |
| 4 | 2.2◻ | 2 | 2.0◻ | 1.1◻ | 6◻ | 3◻ | 2◻ | 1◻ |
| 4 | 4.4◻ | 2 | 2.0◻ | 1.2◻ | 6◻ | 3◻ | 2◻ | 1◻ |
| 4 | 5.5◻ | 2 | 3.0◻ | 1.2◻ | 6◻ | 3◻ | 2◻ | 1◻ |
| 4 | 7.7◻ | 2 | 4.0◻ | 1.2◻ | 6◻ | 3◻ | 2◻ | 1◻ |
| 4 | 8.8◻ | 2 | 5.0◻ | 1.3◻ | 7◻ | 3◻ | 2◻ | 1◻ |
| 5 | 5.0◻ | 2 | 6.0◻ | 1.3◻ | 7◻ | 4◻ | 2◻ | 1◻ |
| 5 | 5.2◻ | 2 | 7.0◻ | 1.4◻ | 7◻ | 4◻ | 2◻ | 1◻ |
| 5 | 5.4◻ | 2 | 8.0◻ | 1.4◻ | 7◻ | 4◻ | 2◻ | 1◻ |
| 5 | 5.6◻ | 2 | 9.0◻ | 1.5◻ | 8◻ | 4◻ | 2◻ | 1◻ |
| 5 | 8.0◻ | 3 | 1.0◻ | 1.5◻ | 8◻ | 4◻ | 2◻ | 1◻ |
| 6 | 0.3◻ | 3 | 1.0◻ | 1.6◻ | 8◻ | 4◻ | 2◻ | 1◻ |

COMPOUND INTER-INTRA PREDICTION MODES

CROSS-REFERENCE TO RELATED APPLICATION(S)

This application is based on and claims priority to U.S. Provisional Patent Application No. 63/316,819 filed on Mar. 4, 2022, the disclosure of which is incorporated by reference herein in its entirety.

TECHNICAL FIELD

The present disclosure provides a set of advanced video coding technologies designed for efficient compression of video data. More specifically, methods for deriving weightings between intra and inter prediction samples for compound inter-intra prediction modes are disclosed.

BACKGROUND

AOMedia Video 1 (AV1) was developed as a successor to VP9 by the Alliance for Open Media (AOMedia), a consortium founded in 2015 that includes semiconductor firms, video on demand providers, video content producers, software development companies and web browser vendors. Many of the components of the AV1 project were sourced from previous research efforts by Alliance members. Individual contributors started experimental technology platforms years before: Xiph's/Mozilla's Daala already published code in 2010, Google's experimental VP9 evolution project VP10 was announced on 12 Sep. 2014, and Cisco's Thor was published on 11 Aug. 2015. Building on the codebase of VP9, AV1 incorporates additional techniques, several of which were developed in these experimental formats. The first version 0.1.0 of the AV1 reference codec was published on 7 Apr. 2016. The Alliance announced the release of the AV1 bitstream specification on 28 Mar. 2018, along with a reference, software-based encoder and decoder. On 25 Jun. 2018, a validated version 1.0.0 of the specification was released. On 8 Jan. 2019 a validated version 1.0.0 with Errata 1 of the specification was released. The AV1 bitstream specification includes a reference video codec.

AOMedia Video 2 (AV2) is currently under development and the proposed 8-bit/10-bit transform cores are designed for it.

SUMMARY

The following presents a simplified summary of one or more embodiments of the present disclosure in order to provide a basic understanding of such embodiments. This summary is not an extensive overview of all contemplated embodiments, and is intended to neither identify key or critical elements of all embodiments nor delineate the scope of any or all embodiments. Its sole purpose is to present some concepts of one or more embodiments of the present disclosure in a simplified form as a prelude to the more detailed description that is presented later.

This disclosure provides a method for deriving weightings between intra and inter prediction samples for compound inter-intra prediction modes.

According to an exemplary embodiment, a method executed by one or more processors in a video decoder. The method includes receiving a coded video bitstream that includes a current picture. The method further includes defining, for a block included in the current picture, a template area of neighboring reconstruction or prediction samples of the block. The method further includes applying one or more adaptive weighting candidates to the template area to generate one or more prediction samples using a compound inter-intra prediction mode. The method further includes calculating a cost value for each of the one or more adaptive weighting candidates. The method further includes selecting an adaptive weighting candidate from the one or more adaptive weighting candidates that provides a lowest cost as the weighting used for decoding the block. The method further includes decoding the block based on the selected adaptive weighting and the generated one or more prediction samples.

According to an exemplary embodiment, an apparatus includes at least one memory configured to store computer program code and at least one processor configured to access the computer program code and operate as instructed by the computer program code. The computer program code includes receiving code configured to cause the at least one processor to receive a coded video bitstream that includes a current picture. The computer program code further includes defining code configured to cause the at least one processor to define, for a block included in the current picture, a template area of neighboring reconstruction or prediction samples of the block. The computer program code further includes applying code configured to cause the at least one processor to apply one or more adaptive weighting candidates to the template area to generate one or more prediction samples using a compound inter-intra prediction mode. The computer program code further includes calculating code configured to cause the at least one processor to calculate a cost value for each of the one or more adaptive weighting candidates. The computer program code further includes selecting code configured to cause the at least one processor to select an adaptive weighting candidate from the one or more adaptive weighting candidates that provides a lowest cost as the weighting used for decoding the block. The computer program code further includes decoding code configured to cause the at least one processor to decode the block based on the selected adaptive weighting and the generated one or more prediction samples.

According to an exemplary embodiment, a non-transitory computer readable medium having stored thereon computer instructions that when executed by at least one processor cause the at least one processor to execute a method. The method includes receiving a coded video bitstream that includes a current picture. The method further includes defining, for a block included in the current picture, a template area of neighboring reconstruction or prediction samples of the block. The method further includes applying one or more adaptive weighting candidates to the template area to generate one or more prediction samples using a compound inter-intra prediction mode. The method further includes calculating a cost value for each of the one or more adaptive weighting candidates. The method further includes selecting an adaptive weighting candidate from the one or more adaptive weighting candidates that provides a lowest cost as the weighting used for decoding the block. The method further includes decoding the block based on the selected adaptive weighting and the generated one or more prediction samples.

Additional embodiments will be set forth in the description that follows and, in part, will be apparent from the description, and/or may be learned by practice of the presented embodiments of the disclosure.

BRIEF DESCRIPTION OF THE DRAWINGS

The above and other features and aspects of embodiments of the disclosure will be apparent from the following description taken in conjunction with the accompanying drawings, in which:

FIG. 8 is a table of CIIP modes, in accordance with various embodiments of the present disclosure.

FIG. 9 is a look-up table used in CIIP mode, in accordance with various embodiments of the present disclosure.

DETAILED DESCRIPTION

The following detailed description of example embodiments refers to the accompanying drawings. The same reference numbers in different drawings may identify the same or similar elements.

The foregoing disclosure provides illustration and description, but is not intended to be exhaustive or to limit the implementations to the precise form disclosed. Modifications and variations are possible in light of the above disclosure or may be acquired from practice of the implementations. Further, one or more features or components of one embodiment may be incorporated into or combined with another embodiment (or one or more features of another embodiment). Additionally, in the flowcharts and descriptions of operations provided below, it is understood that one or more operations may be omitted, one or more operations may be added, one or more operations may be performed simultaneously (at least in part), and the order of one or more operations may be switched.

It will be apparent that systems and/or methods, described herein, may be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code. It is understood that software and hardware may be designed to implement the systems and/or methods based on the description herein.

Even though particular combinations of features are recited in the claims and/or disclosed in the specification, these combinations are not intended to limit the disclosure of possible implementations. In fact, many of these features may be combined in ways not specifically recited in the claims and/or disclosed in the specification. Although each dependent claim listed below may directly depend on only one claim, the disclosure of possible implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Where only one item is intended, the term "one" or similar language is used. Also, as used herein, the terms "has," "have," "having," "include," "including," or the like are intended to be open-ended terms. Further, the phrase "based on" is intended to mean "based, at least in part, on" unless explicitly stated otherwise. Furthermore, expressions such as "at least one of [A] and [B]" or "at least one of [A] or [B]" are to be understood as including only A, only B, or both A and B.

Figure 1:
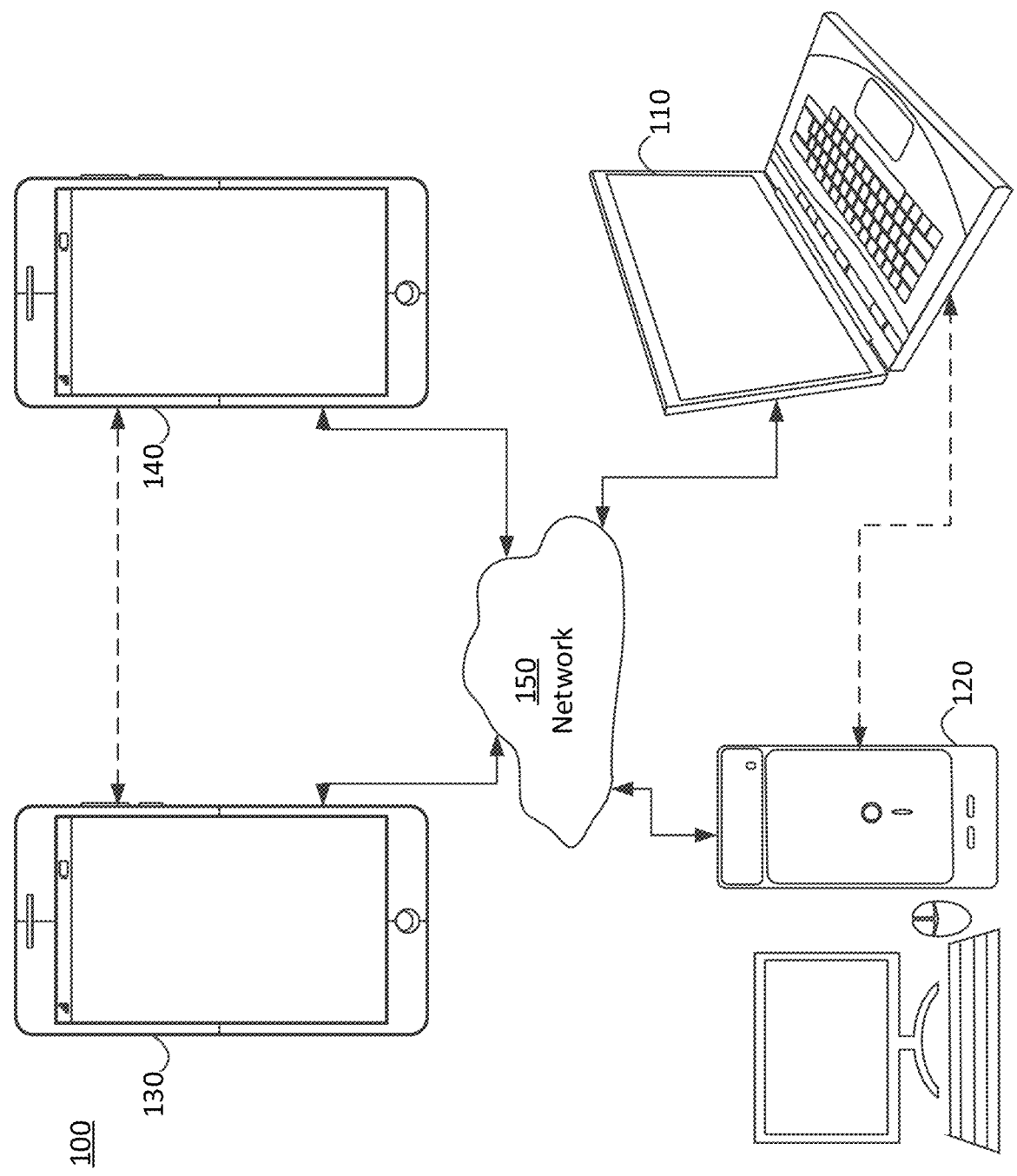
FIG. 1 is a schematic illustration of a block diagram of a communication system, in accordance with various embodiments of the present disclosure.

FIG. 1 illustrates a simplified block diagram of a communication system (100) according to an embodiment of the present disclosure. The system (100) may include at least two terminals (110, 120) interconnected via a network (150). For unidirectional transmission of data, a first terminal (110) may code video data at a local location for transmission to the other terminal (120) via the network (150). The second terminal (120) may receive the coded video data of the other terminal from the network (150), decode the coded data and display the recovered video data. Unidirectional data transmission may be common in media serving applications and the like.

FIG. 1 illustrates a second pair of terminals (130, 140) provided to support bidirectional transmission of coded video that may occur, for example, during videoconferencing. For bidirectional transmission of data, each terminal (130, 140) may code video data captured at a local location for transmission to the other terminal via the network (150). Each terminal (130, 140) also may receive the coded video data transmitted by the other terminal, may decode the coded data, and may display the recovered video data at a local display device.

In FIG. 1, the terminals (110-140) may be illustrated as servers, personal computers, and smart phones, and/or any other type of terminal. For example, the terminals (110-140) may be laptop computers, tablet computers, media players and/or dedicated video conferencing equipment. The network (150) represents any number of networks that convey coded video data among the terminals (110-140), including for example wireline and/or wireless communication networks. The communication network (150) may exchange data in circuit-switched and/or packet-switched channels. Representative networks include telecommunications networks, local area networks, wide area networks, and/or the Internet. For the purposes of the present discussion, the architecture and topology of the network (150) may be immaterial to the operation of the present disclosure unless explained herein below.

Figure 2:
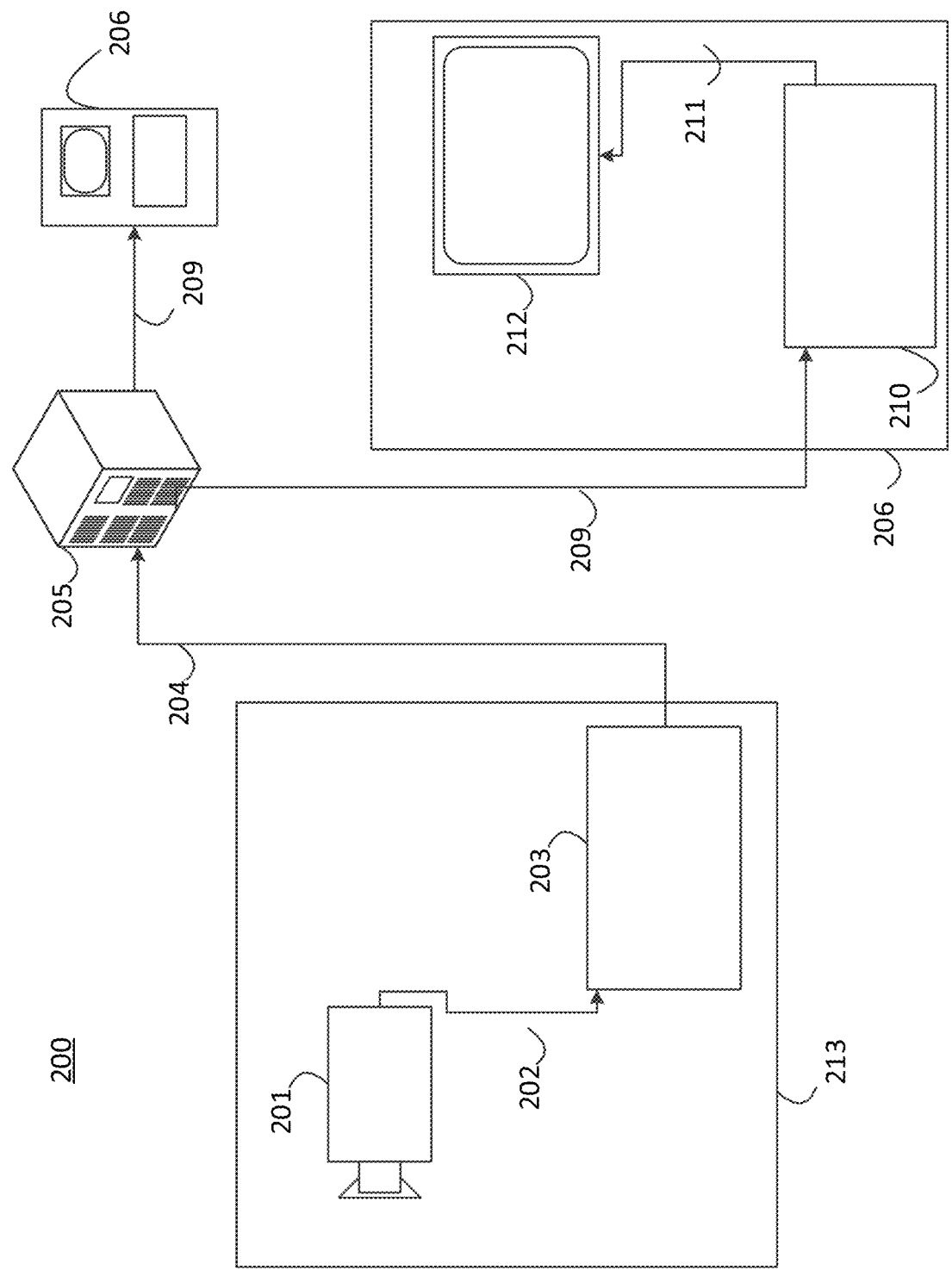
FIG. 2 is a schematic illustration of a block diagram of a communication system, in accordance with various embodiments of the present disclosure.

FIG. 2 illustrates, as an example for an application for the disclosed subject matter, the placement of a video encoder and decoder in a streaming environment. The disclosed subject matter may be equally applicable to other video enabled applications, including, for example, video conferencing, digital TV, storing of compressed video on digital media including CD, DVD, memory stick and the like, and so on.

As illustrated in FIG. 2, a streaming system (200) may include a capture subsystem (213) that can include a video source (201) and an encoder (203). The video source (201) may be, for example, a digital camera, and may be configured to create an uncompressed video sample stream (202). The uncompressed video sample stream (202) may provide a high data volume when compared to encoded video bitstreams, and may be processed by the encoder (203) coupled to the camera (201). The encoder (203) can include hardware, software, or a combination thereof to enable or implement aspects of the disclosed subject matter as described in more detail below. The encoded video bitstream (204) may include a lower data volume when compared to the sample stream, and may be stored on a streaming server (205) for future use. One or more streaming clients (206) can access the streaming server (205) to retrieve video bit streams (209) that may be copies of the encoded video bitstream (204).

In embodiments, the streaming server (205) may also function as a Media-Aware Network Element (MANE). For example, the streaming server (205) may be configured to prune the encoded video bitstream (204) for tailoring potentially different bitstreams to one or more of the streaming clients (206). In embodiments, a MANE may be separately provided from the streaming server (205) in the streaming system (200).

The streaming clients (206) can include a video decoder (210) and a display (212). The video decoder (210) can, for example, decode video bitstream (209), which is an incoming copy of the encoded video bitstream (204), and create an outgoing video sample stream (211) that may be rendered on the display (212) or another rendering device (not depicted). In some streaming systems, the video bitstreams (204, 209) may be encoded according to certain video coding/compression standards. Examples of such standards include, but are not limited to, ITU-T Recommendation H.265. Under development is a video coding standard informally known as Versatile Video Coding (VVC). Embodiments of the disclosure may be used in the context of VVC.

Figure 3:
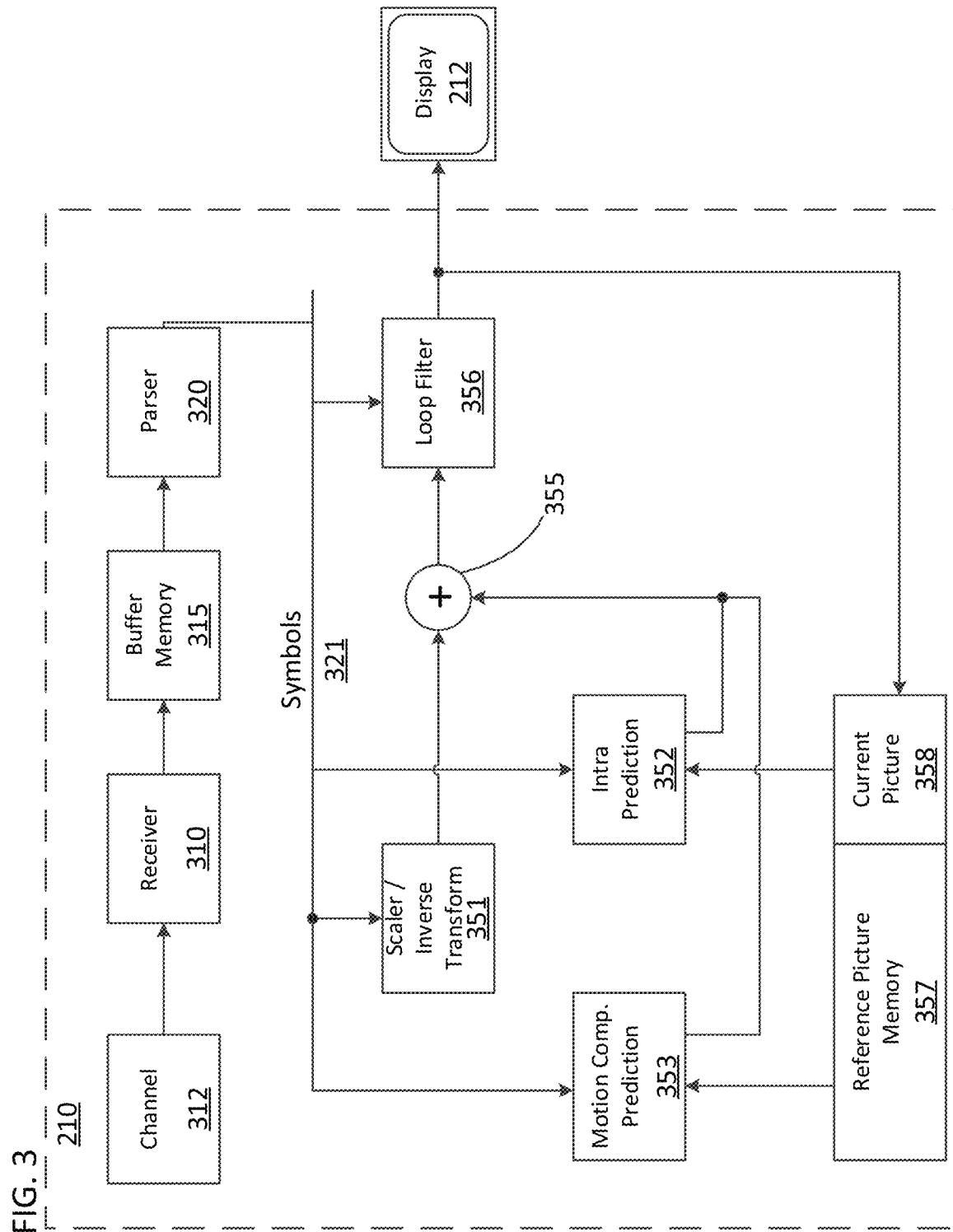
FIG. 3 is a schematic illustration of a block diagram of a decoder, in accordance with various embodiments of the present disclosure.

FIG. 3 illustrates an example functional block diagram of a video decoder (210) that is attached to a display (212) according to an embodiment of the present disclosure. The video decoder (210) may include a channel (312), receiver (310), a buffer memory (315), an entropy decoder/parser (320), a scaler/inverse transform unit (351), an intra prediction unit (352), a Motion Compensation Prediction unit (353), an aggregator (355), a loop filter unit (356), reference picture memory (357), and current picture memory ( ). In at least one embodiment, the video decoder (210) may include an integrated circuit, a series of integrated circuits, and/or other electronic circuitry. The video decoder (210) may also be partially or entirely embodied in software running on one or more CPUs with associated memories.

In this embodiment, and other embodiments, the receiver (310) may receive one or more coded video sequences to be decoded by the decoder (210) one coded video sequence at a time, where the decoding of each coded video sequence is independent from other coded video sequences. The coded video sequence may be received from the channel (312), which may be a hardware/software link to a storage device which stores the encoded video data. The receiver (310) may receive the encoded video data with other data, for example, coded audio data and/or ancillary data streams, that may be forwarded to their respective using entities (not depicted).

The receiver (310) may separate the coded video sequence from the other data. To combat network jitter, the buffer memory (315) may be coupled in between the receiver (310) and the entropy decoder/parser (320) ("parser" henceforth). When the receiver (310) is receiving data from a store/forward device of sufficient bandwidth and controllability, or from an isosynchronous network, the buffer (315) may not be used, or may be small. For use on best effort packet networks such as the Internet, the buffer (315) may be required, may be comparatively large, and may be of adaptive size.

The video decoder (210) may include a parser (320) to reconstruct symbols (321) from the entropy coded video sequence. Categories of those symbols include, for example, information used to manage operation of the decoder (210), and potentially information to control a rendering device such as a display (212) that may be coupled to a decoder as illustrated in FIG. 2. The control information for the rendering device(s) may be in the form of, for example, Supplementary Enhancement Information (SEI) messages or Video Usability Information (VUI) parameter set fragments (not depicted). The parser (320) may parse/entropy-decode the coded video sequence received. The coding of the coded video sequence may be in accordance with a video coding technology or standard, and can follow principles well known to a person skilled in the art, including variable length coding, Huffman coding, arithmetic coding with or without context sensitivity, and so forth. The parser (320) may extract from the coded video sequence, a set of subgroup parameters for at least one of the subgroups of pixels in the video decoder, based upon at least one parameters corresponding to the group. Subgroups can include Groups of Pictures (GOPs), pictures, tiles, slices, macroblocks, Coding Units (CUs), blocks, Transform Units (TUs), Prediction Units (PUs) and so forth. The parser (320) may also extract from the coded video sequence information such as transform coefficients, quantizer parameter values, motion vectors, and so forth.

The parser (320) may perform entropy decoding/parsing operation on the video sequence received from the buffer (315), so to create symbols (321). Reconstruction of the symbols (321) can involve multiple different units depending on the type of the coded video picture or parts thereof (such as: inter and intra picture, inter and intra block), and other factors. Which units are involved, and how they are involved, may be controlled by the subgroup control information that was parsed from the coded video sequence by the parser (320). The flow of such subgroup control information between the parser (320) and the multiple units below is not depicted for clarity.

Beyond the functional blocks already mentioned, decoder (210) may be conceptually subdivided into a number of functional units as described below. In a practical implementation operating under commercial constraints, many of these units interact closely with each other and can, at least partly, be integrated into each other. However, for the purpose of describing the disclosed subject matter, the conceptual subdivision into the functional units below is appropriate.

One unit may be the scaler/inverse transform unit (351). The scaler/inverse transform unit (351) may receive quantized transform coefficient as well as control information, including which transform to use, block size, quantization factor, quantization scaling matrices, etc. as symbol(s) (321) from the parser (320). The scaler/inverse transform unit (351) can output blocks including sample values that may be input into the aggregator (355).

In some cases, the output samples of the scaler/inverse transform (351) can pertain to an intra coded block; that is: a block that is not using predictive information from previously reconstructed pictures, but can use predictive information from previously reconstructed parts of the current picture. Such predictive information may be provided by an intra picture prediction unit (352). In some cases, the intra picture prediction unit (352) generates a block of the same size and shape of the block under reconstruction, using surrounding already reconstructed information fetched from the current (partly reconstructed) picture from the current picture memory (358). The aggregator (355), in some cases, adds, on a per sample basis, the prediction information the intra prediction unit (352) has generated to the output sample information as provided by the scaler/inverse transform unit (351).

In other cases, the output samples of the scaler/inverse transform unit (351) can pertain to an inter coded, and potentially motion compensated block. In such a case, a Motion Compensation Prediction unit (353) can access reference picture memory (357) to fetch samples used for prediction. After motion compensating the fetched samples in accordance with the symbols (321) pertaining to the block, these samples may be added by the aggregator (355) to the output of the scaler/inverse transform unit (351) (in this case called the residual samples or residual signal) so to generate output sample information. The addresses within the reference picture memory (357), from which the Motion Compensation Prediction unit (353) fetches prediction samples, may be controlled by motion vectors. The motion vectors may be available to the Motion Compensation Prediction unit (353) in the form of symbols (321) that can have, for example, X, Y, and reference picture components. Motion compensation also can include interpolation of sample values as fetched from the reference picture memory (357) when sub-sample exact motion vectors are in use, motion vector prediction mechanisms, and so forth.

The output samples of the aggregator (355) may be subject to various loop filtering techniques in the loop filter unit (356). Video compression technologies can include in-loop filter technologies that are controlled by parameters included in the coded video bitstream and made available to the loop filter unit (356) as symbols (321) from the parser (320), but can also be responsive to meta-information obtained during the decoding of previous (in decoding order) parts of the coded picture or coded video sequence, as well as responsive to previously reconstructed and loop-filtered sample values.

The output of the loop filter unit (356) may be a sample stream that may be output to a render device such as a display (212), as well as stored in the reference picture memory (357) for use in future inter-picture prediction.

Certain coded pictures, once fully reconstructed, may be used as reference pictures for future prediction. Once a coded picture is fully reconstructed and the coded picture has been identified as a reference picture (by, for example, parser (320)), the current reference picture may become part of the reference picture memory (357), and a fresh current picture memory may be reallocated before commencing the reconstruction of the following coded picture.

The video decoder (210) may perform decoding operations according to a predetermined video compression technology that may be documented in a standard, such as ITU-T Rec. H.265. The coded video sequence may conform to a syntax specified by the video compression technology or standard being used, in the sense that it adheres to the syntax of the video compression technology or standard, as specified in the video compression technology document or standard and specifically in the profiles document therein. Also, for compliance with some video compression technologies or standards, the complexity of the coded video sequence may be within bounds as defined by the level of the video compression technology or standard. In some cases, levels restrict the maximum picture size, maximum frame rate, maximum reconstruction sample rate (measured in, for example megasamples per second), maximum reference picture size, and so on. Limits set by levels can, in some cases, be further restricted through Hypothetical Reference Decoder (HRD) specifications and metadata for HRD buffer management signaled in the coded video sequence.

In an embodiment, the receiver (310) may receive additional (redundant) data with the encoded video. The additional data may be included as part of the coded video sequence(s). The additional data may be used by the video decoder (210) to properly decode the data and/or to more accurately reconstruct the original video data. Additional data may be in the form of, for example, temporal, spatial, or SNR enhancement layers, redundant slices, redundant pictures, forward error correction codes, and so on.

Figure 4:
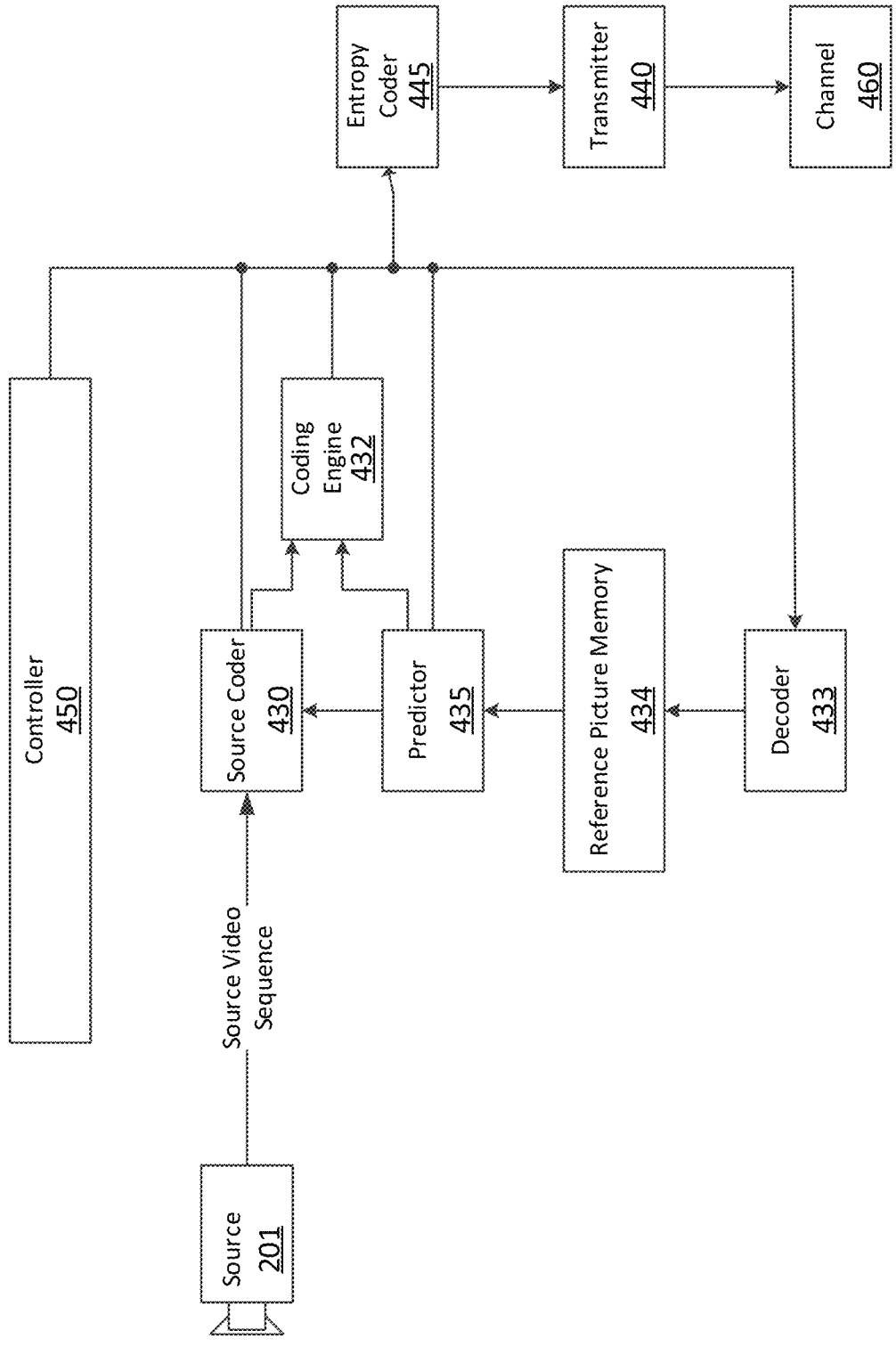
FIG. 4 is a block diagram of an encoder, in accordance with various embodiments of the present disclosure.

FIG. 4 illustrates an example functional block diagram of a video encoder (203) associated with a video source (201) according to an embodiment of the present disclosure. The video encoder (203) may include, for example, an encoder that is a source coder (430), a coding engine (432), a (local) decoder (433), a reference picture memory (434), a predictor (435), a transmitter (440), an entropy coder (445), a controller (450), and a channel (460).

The encoder (203) may receive video samples from a video source (201) (that is not part of the encoder) that may capture video image(s) to be coded by the encoder (203). The video source (201) may provide the source video sequence to be coded by the encoder (203) in the form of a digital video sample stream that may be of any suitable bit depth (for example: 8 bit, 10 bit, 12 bit, . . . ), any colorspace (for example, BT.601 Y CrCB, RGB, . . . ) and any suitable sampling structure (for example Y CrCb 4:2:0, Y CrCb 4:4:4). In a media serving system, the video source (201) may be a storage device storing previously prepared video. In a videoconferencing system, the video source (203) may be a camera that captures local image information as a video sequence. Video data may be provided as a plurality of individual pictures that impart motion when viewed in sequence. The pictures themselves may be organized as a spatial array of pixels, wherein each pixel can include one or more sample depending on the sampling structure, color space, etc. in use. A person skilled in the art can readily understand the relationship between pixels and samples. The description below focuses on samples.

According to an embodiment, the encoder (203) may code and compress the pictures of the source video sequence into a coded video sequence (443) in real time or under any other time constraints as required by the application. Enforcing appropriate coding speed is one function of controller (450). The controller (450) may also control other functional units as described below and may be functionally coupled to these units. The coupling is not depicted for clarity. Parameters set by the controller (450) can include rate control related parameters (picture skip, quantizer, lambda value of rate-distortion optimization techniques, . . . ), picture size, group of pictures (GOP) layout, maximum motion vector search range, and so forth. A person skilled in the art can readily identify other functions of controller (450) as they may pertain to video encoder (203) optimized for a certain system design.

Some video encoders operate in what a person skilled in the are readily recognizes as a "coding loop". As an oversimplified description, a coding loop can consist of the encoding part of the source coder (430) (responsible for creating symbols based on an input picture to be coded, and a reference picture(s)), and the (local) decoder (433) embedded in the encoder (203) that reconstructs the symbols to create the sample data that a (remote) decoder also would create when a compression between symbols and coded video bitstream is lossless in certain video compression technologies. That reconstructed sample stream may be input to the reference picture memory (434). As the decoding of a symbol stream leads to bit-exact results independent of decoder location (local or remote), the reference picture memory content is also bit exact between a local encoder and a remote encoder. In other words, the prediction part of an encoder "sees" as reference picture samples exactly the same sample values as a decoder would "see" when using prediction during decoding. This fundamental principle of reference picture synchronicity (and resulting drift, if synchronicity cannot be maintained, for example because of channel errors) is known to a person skilled in the art.

The operation of the "local" decoder (433) may be the same as of a "remote" decoder (210), which has already been described in detail above in conjunction with FIG. 3. However, as symbols are available and en/decoding of symbols to a coded video sequence by the entropy coder (445) and the parser (320) may be lossless, the entropy decoding parts of decoder (210), including channel (312), receiver (310), buffer (315), and parser (320) may not be fully implemented in the local decoder (433).

An observation that may be made at this point is that any decoder technology, except the parsing/entropy decoding that is present in a decoder, may need to be present, in substantially identical functional form in a corresponding encoder. For this reason, the disclosed subject matter focuses on decoder operation. The description of encoder technologies may be abbreviated as they may be the inverse of the comprehensively described decoder technologies. Only in certain areas a more detail description is required and provided below.

As part of its operation, the source coder (430) may perform motion compensated predictive coding, which codes an input frame predictively with reference to one or more previously-coded frames from the video sequence that were designated as "reference frames." In this manner, the coding engine (432) codes differences between pixel blocks of an input frame and pixel blocks of reference frame(s) that may be selected as prediction reference(s) to the input frame.

The local video decoder (433) may decode coded video data of frames that may be designated as reference frames, based on symbols created by the source coder (430). Operations of the coding engine (432) may advantageously be lossy processes. When the coded video data may be decoded at a video decoder (not shown in FIG. 4), the reconstructed video sequence typically may be a replica of the source video sequence with some errors. The local video decoder (433) replicates decoding processes that may be performed by the video decoder on reference frames and may cause reconstructed reference frames to be stored in the reference picture memory (434). In this manner, the encoder (203) may store copies of reconstructed reference frames locally that have common content as the reconstructed reference frames that will be obtained by a far-end video decoder (absent transmission errors).

The predictor (435) may perform prediction searches for the coding engine (432). That is, for a new frame to be coded, the predictor (435) may search the reference picture memory (434) for sample data (as candidate reference pixel blocks) or certain metadata such as reference picture motion vectors, block shapes, and so on, that may serve as an appropriate prediction reference for the new pictures. The predictor (435) may operate on a sample block-by-pixel block basis to find appropriate prediction references. In some cases, as determined by search results obtained by the predictor (435), an input picture may have prediction references drawn from multiple reference pictures stored in the reference picture memory (434).

The controller (450) may manage coding operations of the video coder (430), including, for example, setting of parameters and subgroup parameters used for encoding the video data. Output of all aforementioned functional units may be subjected to entropy coding in the entropy coder (445). The entropy coder translates the symbols as generated by the various functional units into a coded video sequence, by loss-less compressing the symbols according to technologies known to a person skilled in the art as, for example Huffman coding, variable length coding, arithmetic coding, and so forth.

The transmitter (440) may buffer the coded video sequence(s) as created by the entropy coder (445) to prepare it for transmission via a communication channel (460), which may be a hardware/software link to a storage device which would store the encoded video data. The transmitter (440) may merge coded video data from the video coder (430) with other data to be transmitted, for example, coded audio data and/or ancillary data streams (sources not shown). The controller (450) may manage operation of the encoder (203). During coding, the controller (450) may assign to each coded picture a certain coded picture type, which may affect the coding techniques that may be applied to the respective picture. For example, pictures often may be assigned as an Intra Picture (I picture), a Predictive Picture (P picture), or a Bi-directionally Predictive Picture (B Picture).

An Intra Picture (I picture) may be one that may be coded and decoded without using any other frame in the sequence as a source of prediction. Some video codecs allow for different types of Intra pictures, including, for example Independent Decoder Refresh (IDR) Pictures. A person skilled in the art is aware of those variants of I pictures and their respective applications and features.

A Predictive picture (P picture) may be one that may be coded and decoded using intra prediction or inter prediction using at most one motion vector and reference index to predict the sample values of each block.

A Bi-directionally Predictive Picture (B Picture) may be one that may be coded and decoded using intra prediction or inter prediction using at most two motion vectors and reference indices to predict the sample values of each block. Similarly, multiple-predictive pictures can use more than two reference pictures and associated metadata for the reconstruction of a single block.

Source pictures commonly may be subdivided spatially into a plurality of sample blocks (for example, blocks of 4×4, 8×8, 4×8, or 16×16 samples each) and coded on a block-by-block basis. Blocks may be coded predictively with reference to other (already coded) blocks as determined by the coding assignment applied to the blocks' respective pictures. For example, blocks of I pictures may be coded non-predictively or they may be coded predictively with reference to already coded blocks of the same picture (spatial prediction or intra prediction). Pixel blocks of P pictures may be coded non-predictively, via spatial prediction or via temporal prediction with reference to one previously coded reference pictures. Blocks of B pictures may be coded non-predictively, via spatial prediction or via temporal prediction with reference to one or two previously coded reference pictures.

The video coder (203) may perform coding operations according to a predetermined video coding technology or standard, such as ITU-T Rec. H.265. In its operation, the video coder (203) may perform various compression operations, including predictive coding operations that exploit temporal and spatial redundancies in the input video sequence. The coded video data, therefore, may conform to a syntax specified by the video coding technology or standard being used.

In an embodiment, the transmitter (440) may transmit additional data with the encoded video. The video coder (430) may include such data as part of the coded video sequence. Additional data may comprise temporal/spatial/SNR enhancement layers, other forms of redundant data such as redundant pictures and slices, Supplementary Enhancement Information (SEI) messages, Visual Usability Information (VUI) parameter set fragments, and so on.

Before describing certain aspects of embodiments of the disclosure in more detail, a few terms are introduced below that are referred to in the remainder of this description.

"Sub-Picture" henceforth refers to, in some cases, a rectangular arrangement of samples, blocks, macroblocks, coding units, or similar entities that are semantically grouped, and that may be independently coded in changed resolution. One or more sub-pictures may form a picture. One or more coded sub-pictures may form a coded picture. One or more sub-pictures may be assembled into a picture, and one or more sub pictures may be extracted from a picture. In certain environments, one or more coded sub-pictures may be assembled in the compressed domain without transcoding to the sample level into a coded picture, and in the same or certain other cases, one or more coded sub-pictures may be extracted from a coded picture in the compressed domain.

"Adaptive Resolution Change" (ARC) henceforth refers to mechanisms that allow the change of resolution of a picture or sub-picture within a coded video sequence, by the means of, for example, reference picture resampling. "ARC parameters" henceforth refer to the control information required to perform adaptive resolution change, that may include, for example, filter parameters, scaling factors, resolutions of output and/or reference pictures, various control flags, and so forth.

Figure 5:
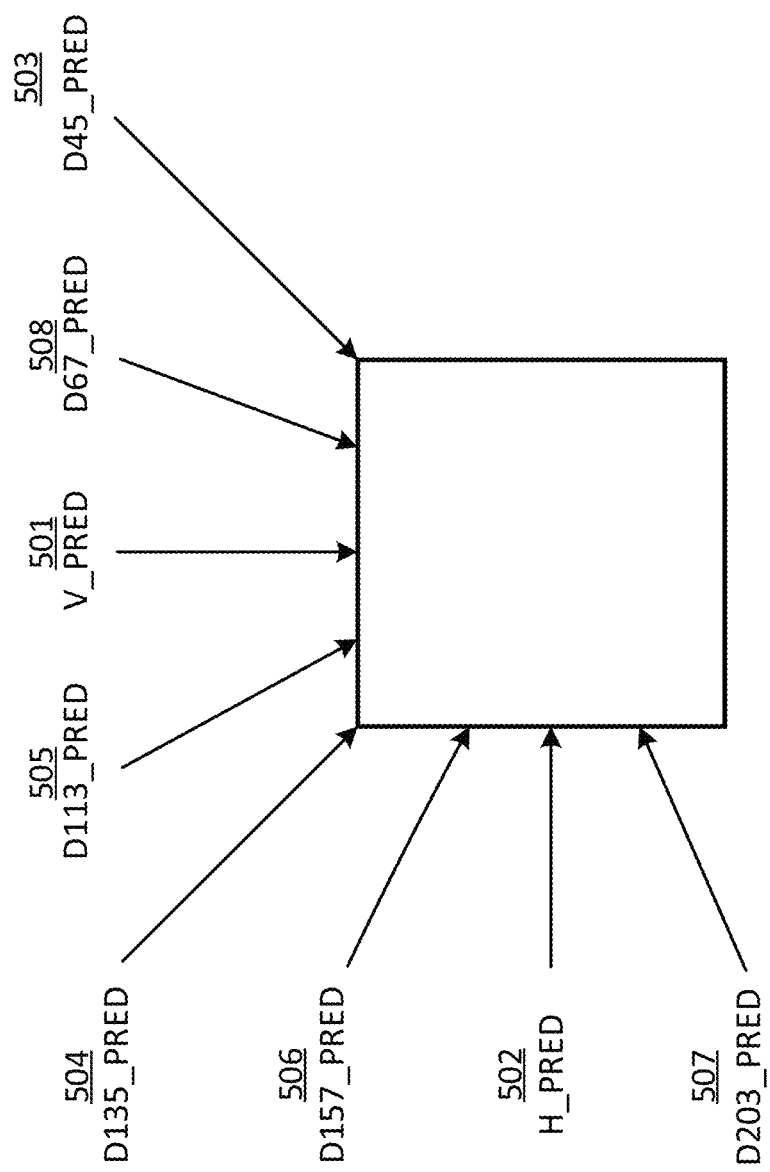
FIG. 5 is a diagram of nominal angles in AV1, in accordance with various embodiments of the present disclosure.

VP9 supports 8 directional modes corresponding to angles from 45 to 207 degrees. To exploit more varieties of spatial redundancy in directional textures, in AV1, directional intra modes are extended to an angle set with finer granularity as shown in FIG. 5. The original 8 angles are slightly changed and made as nominal angles, and these 8 nominal angles are named as V_PRED (501), H_PRED (502), D45_PRED (503), D135_PRED (504), D113_PRED (505), D157_PRED (506), D203_PRED (507), and D67_PRED (508). For each nominal angle, it has 7 finer angles, so AV1 has 56 directional angles in total. The prediction angle may be presented by a nominal intra angle plus an angle delta, which is −3~3 multiplies the step size of 3 degrees. In AV1, 8 nominal modes together with 5 non-angular smooth modes may be firstly signaled, then if a current mode is an angular mode, an index may be further signaled to indicate the angle delta to the corresponding nominal angle. To implement directional prediction modes in AV1 via a generic way, all the 56 directional intra prediction mode in AV1 are implemented with a unified directional predictor that projects each pixel to a reference sub-pixel location and interpolates the reference pixel by a 2-tap bilinear filter.

Figure 6:
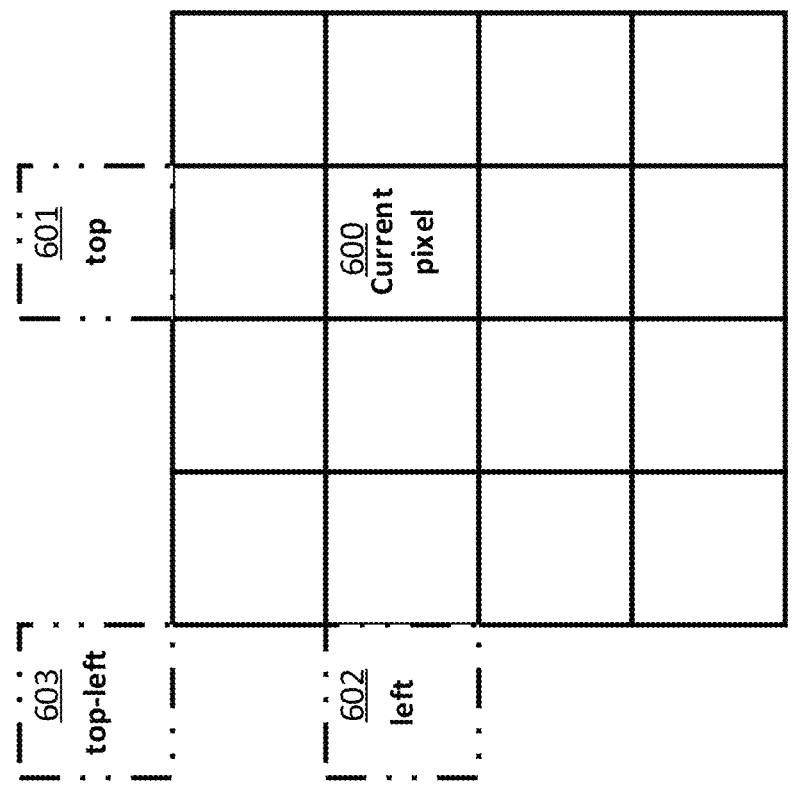
FIG. 6 is a diagram of the locations of the neighboring samples, in accordance with various embodiments of the present disclosure.

In AV1, there are 5 non-directional smooth intra prediction modes, which are DC, PAETH, SMOOTH, SMOOTH_V, and SMOOTH_H. For DC prediction, the average of left and above neighboring samples is used as the predictor of the block to be predicted. For PAETH predictor, top, left and top-left reference samples are firstly fetched, and then the value which is closest to (top+left−topleft) is set as the predictor for the pixel to be predicted. FIG. 6 illustrates the positions of top (601), left (602), and top-left (603) samples for one pixel in current block (600). For SMOOTH, SMOOTH_V, and SMOOTH_H modes, these predict the block using quadratic interpolation in vertical or horizontal directions, or the average both directions.

Figure 7:
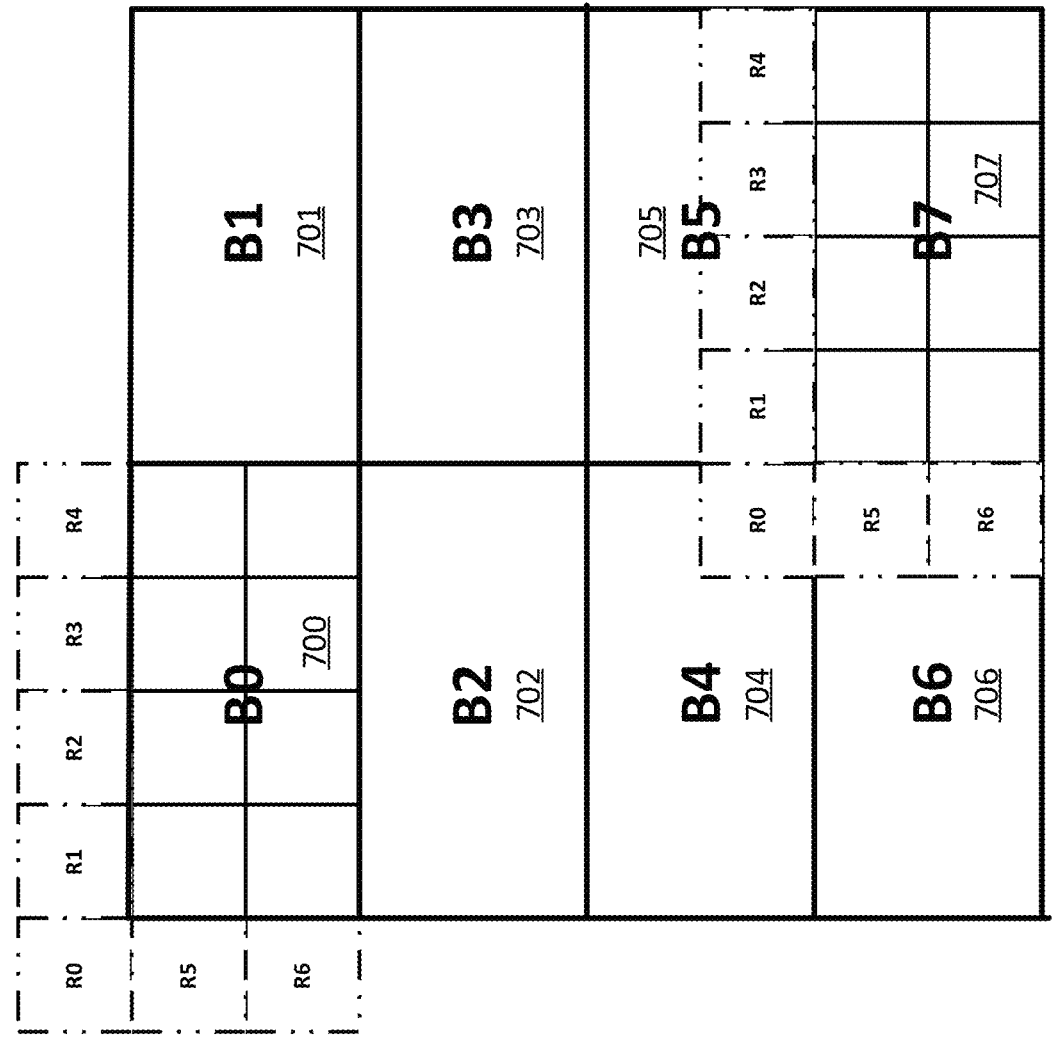
FIG. 7. is a diagram of patches, in accordance with various embodiments of the present disclosure.

To capture decaying spatial correlation with references on the edges, FILTER INTRA modes are designed for luma blocks. Five filter intra modes are pre-designed for AV1, each represented by a set of eight 7-tap filters reflecting correlation between pixels in a 4×2 patch and 7 neighbors adjacent to it. In other words, the weighting factors for 7-tap filter are position dependent. Take an 8×8 block for example, it is split into 8 4×2 patches, which is shown in FIG. 7. These patches are indicated by B0 (700), B1 (701), B2 may (702), B3 (703), B4 (704), B5 (705), B6 (706), and B7 (707) in FIG. 7. For each patch, the corresponding 7 neighbors, indicated by R0~R6, may be used to predict the pixels in current patch. For patch B0 (700), all the neighbors may be already reconstructed. But for other patches, some of the neighbors may not reconstructed, then the predicted values of immediate neighbors are used as the reference. For example, all the neighbors of patch B7 (707) are not reconstructed, so the prediction samples of neighbors are used instead.

In some embodiments, Chroma from Luma (CfL) is a chroma-only intra predictor that models chroma pixels as a linear function of coincident reconstructed luma pixels. The CfL prediction is expressed as follows:

$$CfL(\alpha)=\alpha \times L^{AC}+DC, \qquad \text{eqn. (1)}$$

wherein $L^{AC}$ denotes the AC contribution of luma component, a denotes the parameter of the linear model, and DC denotes the DC contribution of the chroma component. In this regard, the reconstructed luma pixels are subsampled into the chroma resolution, and then the average value is subtracted to form the AC contribution. To approximate chroma AC component from the AC contribution, instead of requiring the decoder to calculate the scaling parameters as in some prior art, AV1 CfL determines the parameter a based on the original chroma pixels and signals them in the bitstream. This reduces decoder complexity and yields more precise predictions. As for the DC contribution of the chroma component, it is computed using intra DC mode, which is sufficient for most chroma content and has mature fast implementations.

In AV1, CIIP mode combines intra and inter prediction to arrive at the final predicted block. The intra prediction may be done using DC, V_PRED, H_PRED, and SMOOTH modes. The intra and inter predictions may be combined using wedge masks that splits the block into two sections at various angles. One section may be filled with intra predicted samples and the other one with inter predicted samples; predefined weight set that gradually reduces the intra prediction weight along its prediction direction. The CIIP modes may be listed in FIG. 8. In compound inter-intra prediction mode, the prediction block is derived as a combination of intra prediction and inter prediction. The intra prediction block is derived using the intra prediction with prediction mode being one of DC_PRED, V_PRED, H_PRED and SMOOTH modes, and the inter prediction block is derived using a single reference inter prediction with translational motion. Depending on how the weightings are derived for the intra prediction sample and inter prediction sample, two compound inter-intra prediction modes may be applied, including the regular inter-intra prediction mode and Wedge-based inter-intra prediction mode.

For different intra prediction mode, the weightings may be derived differently and the weighting value decrease along the prediction direction. More specifically, the weighting applied on the intra prediction sample $P_0(x, y)$ is described as follows, $$w(x, y) = \begin{cases} 32, & DC\_PRED \\ WeightLUT[x \cdot sizeScale], & V\_PRED \\ WeightLUT[y \cdot sizeScale], & H\_PRED \\ WeightLUT[\min(x, y) \cdot sizeScale], & SMOOTH \end{cases} \quad \text{eqn. (2)}$$

where sizeScale is derived as follows using the block width (W) and block height (H), $$sizeScale = 128/\max(W, H), \quad \text{eqn. (3)}$$

and WeightLUT is a hard-coded look-up table described in FIG. 9.

In some embodiments, the compound inter and intra prediction may be also applied using a wedge-based weighting scheme. More specifically, the prediction block may be a combination of intra and inter prediction blocks, and the weightings may be specified using the wedge partitioning pattern that is specified by a signaled syntax wedge_index that specifies the index of wedge partitioning pattern ranging from 0 to 15. Different from the regular wedge-based motion prediction mode, in wedge-based inter intra motion prediction mode, the value of wedge_sign that specifies the partition with the dominant weighting is not signaled but derived.

In compound wedge-based prediction mode, for each block size, a set of 16 predefined two-dimensional weighting arrays may be hard coded. In each array, the weights may be arranged in such a way as to support a predefined wedge partitioning pattern. In each wedge partition pattern, two wedge partitions may be specified along a certain edge direction and position. For samples located in one of the two wedge partitions, the weights may be set to 64. For samples located in the other wedge partition, the weights may be set as 0. Along the wedge partition boundaries, the weights may be set to values between 0 and 64 according to predefined look-up tables.

In wedge-based prediction mode, two syntax elements may be defined: wedge_index, which specifies the wedge partitioning pattern index (ranging from 0 to 15); and wedge_sign, which specifies which of the two partitions is to be assigned to which prediction.

In regular CIIP mode of AV1, the weightings applied on intra prediction and inter prediction for each sample are a fixed value. However, for different coding blocks, more flexible weightings may adapt the statistics better and potentially achieve better coding performance.

Embodiments of the present disclosure are directed to be used separately or combined in any order. More specifically, the embodiments of the present disclosure are directed to a method that may be applied to different video coding standards, such as VP9, AV1, AV2, AVS3, HEVC and VVC.

The term block may be interpreted as a coding block, prediction block, or a transform block. Block size may refer to either the block width or height, or maximum value of width and height, or minimum of width and height, or area size (width*height), or aspect ratio (width:height, or height:width) of the block.

The term chroma channel includes, in some embodiments, both Cb and Cr color components, or both U and V color components. The term luma channel includes, in some embodiments, luma color component, or Y color component.

Figure 10:
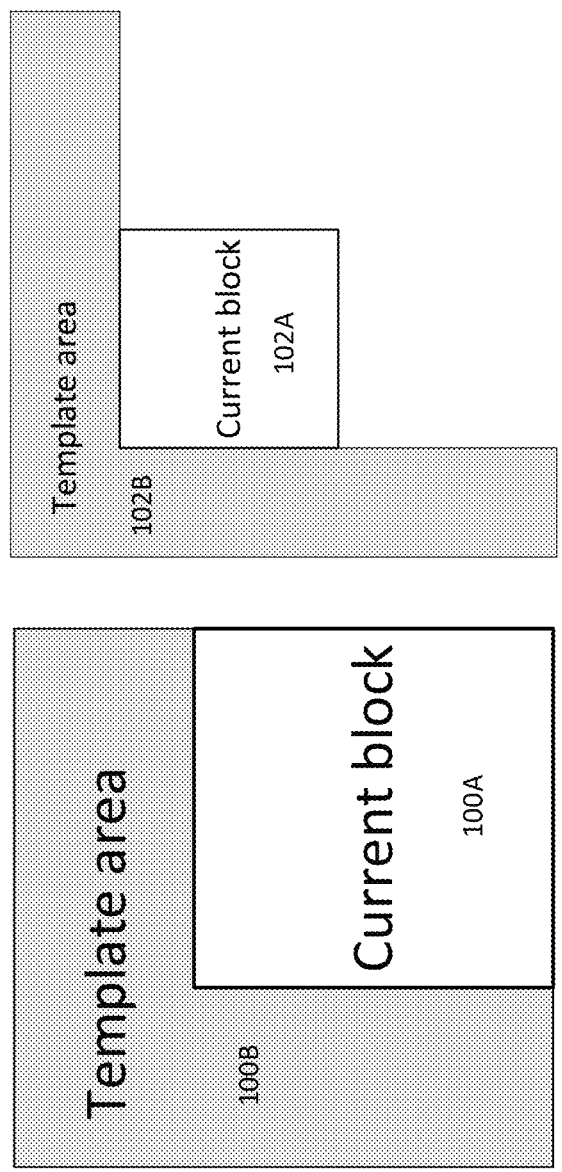
FIG. 10 is a diagram of template areas, in accordance with various embodiments of the present disclosure.

In some embodiments, adaptive weightings may be applied on intra prediction part and inter prediction part in the CIIP mode, and the weightings may be derived or ranked or signaled using neighboring reconstructed/predicted samples. In some embodiments, a template area of neighboring reconstruction/prediction samples may be defined as shown in FIG. 10. Multiple weighting candidates may be applied on this template area to generate prediction samples using CIIP, then a cost value may be calculated for each weighting candidate and the weighting that provides minimum cost may be selected as the weighting used for encoding current block with CIIP mode.

In some embodiments, the template area includes top M rows and left N columns of reconstruction samples. Example values of M and N include, but are not limited to 1, 2, 3, 4, 5, 6, 7, 8 . . . . In one example, as shown in above FIG. 10, the template area may include combinations of top, left and top-left neighboring reconstruction samples, or the template area may further include combinations of top-right and bottom-left neighboring reconstruction samples.

In some embodiments, the cost value may be defined as the prediction error (e.g., sum of squared error, sum of absolute difference) between the reconstruction samples in template area and the prediction samples in template area generated by weighted intra and inter prediction using the weighting candidate. In one example, the weighting candidates include {(a/N, (N−a)/N), where a/N is the weighting applied on intra prediction part, and (N−a)/N may be the weighting applied on inter prediction part. Example values of parameter a include, 1, 2, . . . , N−1. Example values of N include, but are not limited to 2, 4, 8, 16, 32, 64, 128.

In some embodiments, a template area of neighboring reconstruction samples may be defined, then multiple weighting candidates are applied on this template area to generate prediction samples using CIIP, then a cost value may be calculated, where the cost value may be used to rank those weighting candidates. The ranked index of a weighting candidate may be signaled in the bitstream to identify which weighting is applied for encoding.

In some embodiments, both adaptive weighting candidates and constant weightings may be applied in the CIIP mode. Adaptive weighting means the weighting between intra and inter prediction value can vary depending on sample position. Constant weighting means weightings may be the same value regardless of the sample position in the prediction block.

In some embodiments, the selection between sample-adaptive weighting and constant weightings may be explicitly signaled. The adaptive weightings may be derived in the same way of regular CIIP mode in AV1. The adaptive weightings may be derived using a look-up table (LUT). For example, multiple block size and mode dependent LUT's may be defined. The sample position may be used to derive an index to the weighting defined in LUT.

In some embodiments, for constant weightings, the weightings may be either pre-defined, or explicitly signaled with an index specifying the selected weightings, or implicitly derived based on neighboring coded information, including, but not limited to: neighboring reconstruction samples, whether neighboring blocks are coded by intra or inter prediction modes, or CIIP modes, neighboring CIIP weightings.

Figure 11:
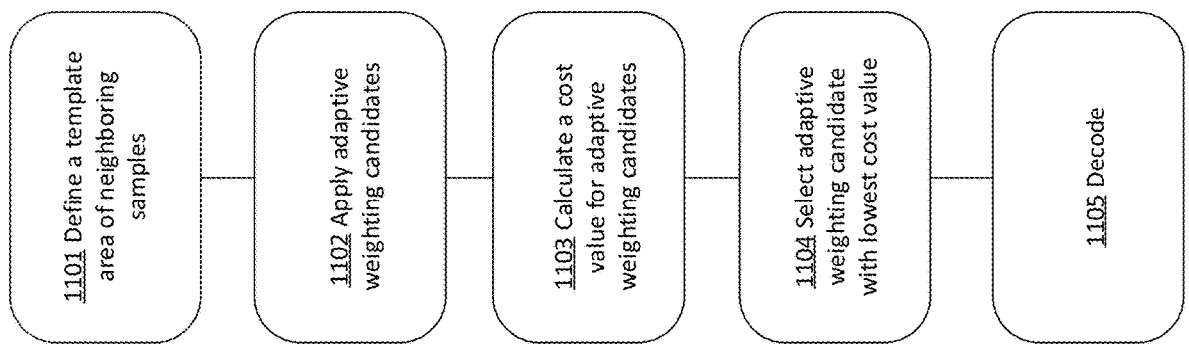
FIG. 11 illustrates a flow chart of an embodiment of a process for deriving weightings for compound inter-intra prediction modes, in accordance with various embodiments of the present disclosure.

FIG. 11 illustrates a flowchart of an embodiment of a process 1100 for deriving weightings between intra and inter prediction samples for compound inter-intra prediction modes. The process (1100) may be performed by a decoder such as decoder (210). The process may start at operation (1101) where a template area of neighboring reconstruction or prediction samples is defined. The process proceeds to operation (1102) where one or more adaptive weighting candidates are applied to the template area. The adaptive weighting candidates are used to generate one or more prediction samples using CIIP.

The process proceeds to operation (1103) where a cost value for each of the one or more adaptive weighting candidates is calculated. The process proceeds to operation (1104) where the adaptive weighting candidate that provides the lowest cost is selected as the weighting used for decoding a block with CIIP. The process proceeds to operation (1105) where the block based on the selected weighting is decoded.

The techniques of embodiments of the present disclosure described above, can be implemented as computer software using computer-readable instructions and physically stored in one or more computer-readable media. For example, FIG. 12 shows a computer system (1200) suitable for implementing embodiments of the disclosed subject matter.

The computer software can be coded using any suitable machine code or computer language, that may be subject to assembly, compilation, linking, or like mechanisms to create code comprising instructions that can be executed directly, or through interpretation, micro-code execution, and the like, by computer central processing units (CPUs), Graphics Processing Units (GPUs), and the like.

The instructions can be executed on various types of computers or components thereof, including, for example, personal computers, tablet computers, servers, smartphones, gaming devices, internet of things devices, and the like.

Figure 12:
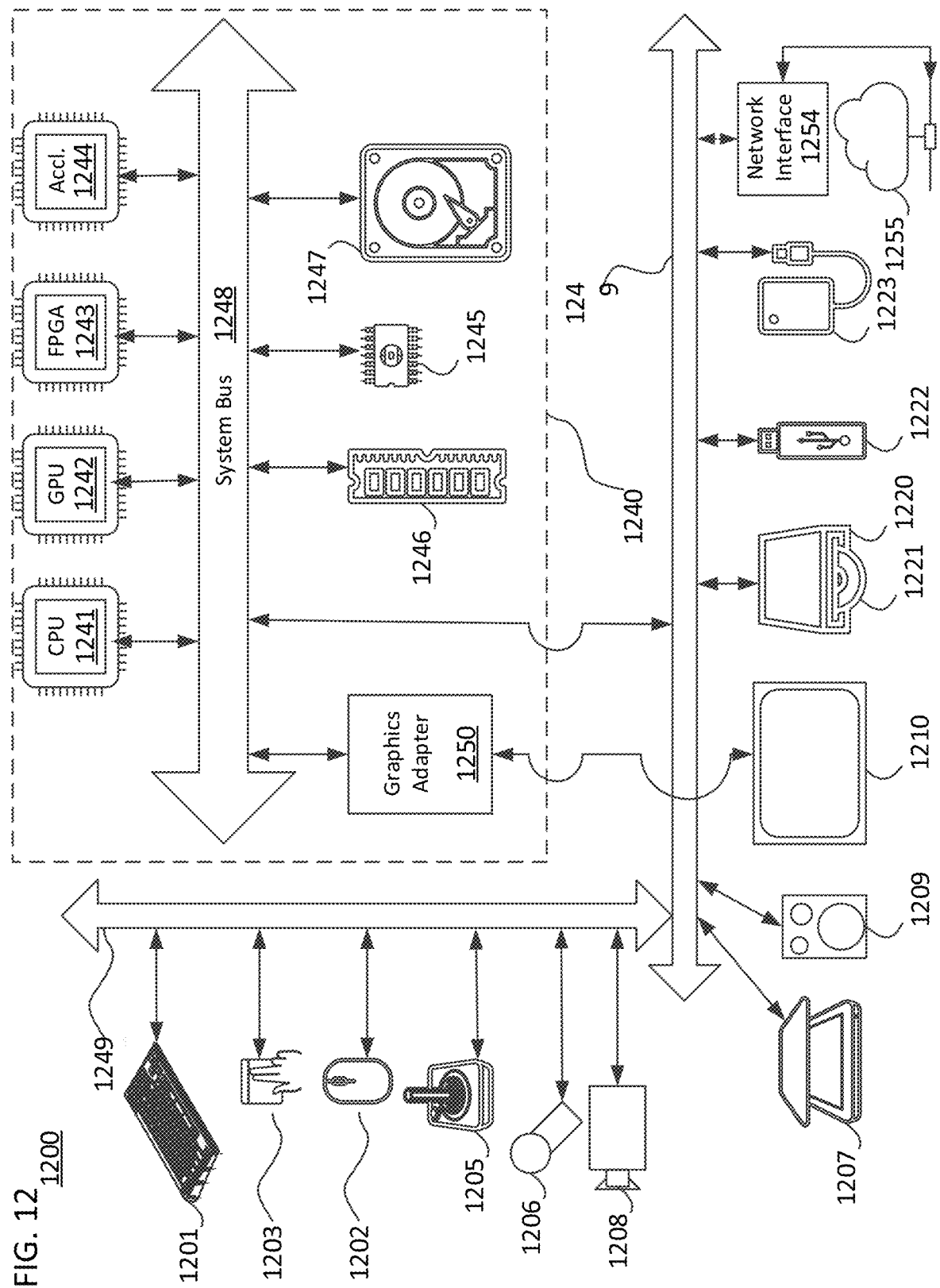
FIG. 12 illustrates an example computer system, in accordance with various embodiments of the present disclosure.

The components shown in FIG. 12 for computer system (1200) are exemplary in nature and are not intended to suggest any limitation as to the scope of use or functionality of the computer software implementing embodiments of the present disclosure. Neither should the configuration of components be interpreted as having any dependency or requirement relating to any one or combination of components illustrated in the exemplary embodiment of a computer system (1200).

Computer system (1200) may include certain human interface input devices. Such a human interface input device may be responsive to input by one or more human users through, for example, tactile input (such as: keystrokes, swipes, data glove movements), audio input (such as: voice, clapping), visual input (such as: gestures), olfactory input (not depicted). The human interface devices can also be used to capture certain media not necessarily directly related to conscious input by a human, such as audio (such as: speech, music, ambient sound), images (such as: scanned images, photographic images obtain from a still image camera), video (such as two-dimensional video, three-dimensional video including stereoscopic video).

Input human interface devices may include one or more of (only one of each depicted): keyboard (1201), mouse (1202), trackpad (1203), touch screen (1210), data-glove, joystick (1205), microphone (1206), scanner (1207), and camera (1208).

Computer system (1200) may also include certain human interface output devices. Such human interface output devices may be stimulating the senses of one or more human users through, for example, tactile output, sound, light, and smell/taste. Such human interface output devices may include tactile output devices (for example tactile feedback by the touch-screen (1210), data-glove, or joystick (1205), but there can also be tactile feedback devices that do not serve as input devices). For example, such devices may be audio output devices (such as: speakers (1209), headphones (not depicted)), visual output devices (such as screens (1210) to include CRT screens, LCD screens, plasma screens, OLED screens, each with or without touch-screen input capability, each with or without tactile feedback capability-some of which may be capable to output two dimensional visual output or more than three dimensional output through means such as stereographic output; virtual-reality glasses (not depicted), holographic displays and smoke tanks (not depicted)), and printers (not depicted).

Computer system (1200) can also include human accessible storage devices and their associated media such as optical media including CD/DVD ROM/RW (1220) with CD/DVD or the like media (1221), thumb-drive (1222), removable hard drive or solid state drive (1223), legacy magnetic media such as tape and floppy disc (not depicted), specialized ROM/ASIC/PLD based devices such as security dongles (not depicted), and the like.

Those skilled in the art should also understand that term "computer readable media" as used in connection with the presently disclosed subject matter does not encompass transmission media, carrier waves, or other transitory signals.

Computer system (1200) can also include interface to one or more communication networks. Networks can for example be wireless, wireline, optical. Networks can further be local, wide-area, metropolitan, vehicular and industrial, real-time, delay-tolerant, and so on. Examples of networks include local area networks such as Ethernet, wireless LANs, cellular networks to include GSM, 3G, 4G, 5G, LTE and the like, TV wireline or wireless wide area digital networks to include cable TV, satellite TV, and terrestrial broadcast TV, vehicular and industrial to include CANBus, and so forth. Certain networks commonly require external network interface adapters that attached to certain general purpose data ports or peripheral buses (1249) (such as, for example USB ports of the computer system (1200); others are commonly integrated into the core of the computer system 1200 by attachment to a system bus as described below (for example Ethernet interface into a PC computer system or cellular network interface into a smartphone computer system). Using any of these networks, computer system (1200) can communicate with other entities. Such communication can be uni-directional, receive only (for example, broadcast TV), uni-directional send-only (for example CANbus to certain CANbus devices), or bi-directional, for example to other computer systems using local or wide area digital networks. Such communication can include communication to a cloud computing environment (1255). Certain protocols and protocol stacks can be used on each of those networks and network interfaces as described above.

Aforementioned human interface devices, human-accessible storage devices, and network interfaces (1254) can be attached to a core (1240) of the computer system (1200).

The core (1240) can include one or more Central Processing Units (CPU) (1241), Graphics Processing Units (GPU) (1242), specialized programmable processing units in the form of Field Programmable Gate Areas (FPGA) (1243), hardware accelerators (1244) for certain tasks, and so forth. These devices, along with Read-only memory (ROM) (1245), Random-access memory (1246), internal mass storage such as internal non-user accessible hard drives, SSDs, and the like (1247), may be connected through a system bus (1248). In some computer systems, the system bus (1248) can be accessible in the form of one or more physical plugs to enable extensions by additional CPUs, GPU, and the like. The peripheral devices can be attached either directly to the core's system bus (1248), or through a peripheral bus (1249). Architectures for a peripheral bus include PCI, USB, and the like. A graphics adapter (1250) may be included in the core (1240).

CPUs (1241), GPUs (1242), FPGAs (1243), and accelerators (1244) can execute certain instructions that, in combination, can make up the aforementioned computer code. That computer code can be stored in ROM (1245) or RAM (1246). Transitional data can be also be stored in RAM (1246), whereas permanent data can be stored for example, in the internal mass storage (1247). Fast storage and retrieve to any of the memory devices can be enabled through the use of cache memory, that can be closely associated with one or more CPU (1241), GPU (1242), mass storage (1247), ROM (1245), RAM (1246), and the like.

The computer readable media can have computer code thereon for performing various computer-implemented operations. The media and computer code can be those specially designed and constructed for the purposes of the present disclosure, or they can be of the kind well known and available to those having skill in the computer software arts.

As an example and not by way of limitation, the computer system having architecture (1200), and specifically the core (1240) can provide functionality as a result of processor(s) (including CPUs, GPUs, FPGA, accelerators, and the like) executing software embodied in one or more tangible, computer-readable media. Such computer-readable media can be media associated with user-accessible mass storage as introduced above, as well as certain storage of the core (1240) that are of non-transitory nature, such as core-internal mass storage (1247) or ROM (1245). The software implementing various embodiments of the present disclosure can be stored in such devices and executed by core (1240). A computer-readable medium can include one or more memory devices or chips, according to particular needs. The software can cause the core (1240) and specifically the processors therein (including CPU, GPU, FPGA, and the like) to execute particular processes or particular parts of particular processes described herein, including defining data structures stored in RAM (1246) and modifying such data structures according to the processes defined by the software. In addition or as an alternative, the computer system can provide functionality as a result of logic hardwired or otherwise embodied in a circuit (for example: accelerator (1244)), which can operate in place of or together with software to execute particular processes or particular parts of particular processes described herein. Reference to software can encompass logic, and vice versa, where appropriate. Reference to a computer-readable media can encompass a circuit (such as an integrated circuit (IC)) storing software for execution, a circuit embodying logic for execution, or both, where appropriate. The present disclosure encompasses any suitable combination of hardware and software.

The foregoing disclosure provides illustration and description, but is not intended to be exhaustive or to limit the implementations to the precise form disclosed. Modifications and variations are possible in light of the above disclosure or may be acquired from practice of the implementations.

It is understood that the specific order or hierarchy of blocks in the processes/flowcharts disclosed herein is an illustration of example approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not meant to be limited to the specific order or hierarchy presented.

Some embodiments may relate to a system, a method, and/or a computer readable medium at any possible technical detail level of integration. Further, one or more of the above components described above may be implemented as instructions stored on a computer readable medium and executable by at least one processor (and/or may include at least one processor). The computer readable medium may include a computer-readable non-transitory storage medium (or media) having computer readable program instructions thereon for causing a processor to carry out operations.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program code/instructions for carrying out operations may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects or operations.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer readable media according to various embodiments. In this regard, each block in the flowchart or block diagrams may represent a module, segment, or portion of instructions, which comprises one or more executable instructions for implementing the specified logical function(s). The method, computer system, and computer readable medium may include additional blocks, fewer blocks, different blocks, or differently arranged blocks than those depicted in the Figures. In some alternative implementations, the functions noted in the blocks may occur out of the order noted in the figures. For example, two blocks shown in succession may, in fact, be executed concurrently or substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It will be apparent that systems and/or methods, described herein, may be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code—it being understood that software and hardware may be designed to implement the systems and/or methods based on the description herein.

Abbreviations

AOMedia Video 1
HEVC: High Efficiency Video Coding
VVC: Versatile Video Coding
CfL: Chroma from Luma
SDT: Semi Decoupled Tree
SDP: Semi Decoupled Partitioning
SB: Super Block
MRLS: Multiple Reference Line Selection
MRLP: Multiple Reference Line Prediction
CDF: Cumulative Density Function The above disclosure also encompasses the embodiments listed below:

(1) A method executed by one or more processors in a video decoder, the method including: receiving a coded video bitstream that includes a current picture; defining, for a block included in the current picture, a template area of neighboring reconstruction or prediction samples of the block; applying one or more adaptive weighting candidates to the template area to generate one or more prediction samples using a compound inter-intra prediction mode; calculating a cost value for each of the one or more adaptive weighting candidates; selecting an adaptive weighting candidate from the one or more adaptive weighting candidates that provides a lowest cost as the weighting used for decoding the block; and decoding the block based on the selected adaptive weighting and the generated one or more prediction samples.

(2) The method of feature (1), in which the one or more adaptive weighting candidates are derived, ranked or signaled using one or more neighboring reconstructed or predicted samples.

(3) The method of feature (1) or (2), in which the template area includes top M rows and left N columns of reconstruction samples.

(4) The method of feature (3), in which the reconstruction samples of the template area comprise one or more combinations of top, left, and top-left neighboring reconstruction samples and combinations of top-right and bottom-left neighboring reconstruction samples.

(5) The method of feature (3), in which the cost value is defined as a prediction error between the reconstruction samples in the template area, and the prediction samples in the template area are generated by weighted intra and inter prediction using the selected adaptive weighting candidate.

(6) The method of any one of features (1)-(5), in which the one or more adaptive weighting candidates include {(a/N, (N−a)/N), where a/N is the weighting applied on an intra prediction block, and (N−a)/N is the weighting applied on an inter prediction block.

(7) The method of any one of features (1)-(6), in which the cost value is used to calculate a ranked index of the one or more adaptive weighting candidates, and the ranked index is signaled in a bitstream to identify which weighting is applied for encoding.

(8) The method of any one of features (1)-(7), in which the one or more adaptive weighting candidates are applied with constant weightings in the compound inter-intra prediction mode.

(9) The method of feature (8), in which the one or more adaptive weighting candidates are derived using a look-up table.

(10) An apparatus including: at least one memory configured to store computer program code; at least one processor configured to access the computer program code and operate as instructed by the computer program code, the computer program code including: receiving code configured to cause the at least one processor to receive a coded video bitstream that includes a current picture; defining code configured to cause the at least one processor to define, for a block included in the current picture, a template area of neighboring reconstruction or prediction samples of the block; applying code configured to cause the at least one processor to apply one or more adaptive weighting candidates to the template area to generate one or more prediction samples using a compound inter-intra prediction mode; calculating code configured to cause the at least one processor to calculate a cost value for each of the one or more adaptive weighting candidates; selecting code configured to cause the at least one processor to select an adaptive weighting candidate from the one or more adaptive weighting candidates that provides a lowest cost as the weighting used for decoding the block; and decoding code configured to cause the at least one processor to decode the block based on the selected adaptive weighting and the generated one or more prediction samples.

(11) The apparatus according to feature (10), in which the one or more adaptive weighting candidates are derived, ranked or signaled using one or more neighboring reconstructed or predicted samples.

(12) The apparatus according to feature (10) or (11), in which the template area includes top M rows and left N columns of reconstruction samples.

(13) The apparatus according to feature (12), in which the reconstruction samples of the template area comprise combinations of top, left, and top-left neighboring reconstruction samples and combinations of top-right and bottom-left neighboring reconstruction samples.

(14) The apparatus according to feature (12), in which the cost value is defined as a prediction error between the reconstruction samples in the template area, and the prediction samples in the template area are generated by weighted intra and inter prediction using the selected adaptive weighting candidate.

(15) The apparatus according to any one of features (10)-(14), in which the one or more adaptive weighting candidates include {(a/N, (N−a)/N), where a/N is the weighting applied on an intra prediction block, and (N−a)/N is the weighting applied on an inter prediction block.

(16) The apparatus according to any one of features (10)-(15), in which the cost value is used to calculate a ranked index of the one or more adaptive weighting candidates, and the ranked index is signaled in a bitstream to identify which weighting is applied for encoding.

(17) The apparatus according to any one of features (10)-(16), in which the one or more adaptive weighting candidates are applied with constant weightings in compound inter-intra prediction modes.

(18) The apparatus according to feature (17), in which the one or more adaptive weighting candidates are derived using a look-up table.

(19) A non-transitory computer readable medium having stored thereon computer instructions that when executed by at least one processor cause the at least one processor to: receive a coded video bitstream that includes a current picture; define, for a block included in the current picture, a template area of neighboring reconstruction or prediction samples of the block; apply one or more adaptive weighting candidates to the template area to generate one or more prediction samples using a compound inter-intra prediction mode; calculate a cost value for each of the one or more adaptive weighting candidates; select an adaptive weighting candidate from the one or more adaptive weighting candidates that provides a lowest cost as the weighting used for decoding the block; and decode the block based on the selected adaptive weighting and the generated one or more prediction samples.

(20) The non-transitory computer readable medium according to feature (19), in which the one or more adaptive weighting candidates are derived, ranked or signaled using one or more neighboring reconstructed or predicted samples.

What is claimed is:

1. A method executed by one or more processors in a video decoder, the method comprising:
receiving a coded video bitstream that includes a current picture;
defining, for a block included in the current picture, a template area of neighboring reconstruction or prediction samples of the block;
applying one or more adaptive weighting candidates to the template area to generate one or more prediction samples using a compound inter-intra prediction mode in which one or more wedge masks split the block into at least a first section and a second section, the first section is filled with intra predicted samples and the second section is filled with inter predicted samples;
calculating a cost value for each of the one or more adaptive weighting candidates;
selecting an adaptive weighting candidate from the one or more adaptive weighting candidates that provides a lowest cost as the weighting used for decoding the block; and
decoding the block based on the selected adaptive weighting and the generated one or more prediction samples,
wherein the cost value is defined as a prediction error between (i) reconstruction samples in the template area, and (ii) the one or more prediction samples in the template area generated by weighted intra and inter prediction using the selected adaptive weighting candidate.

2. The method of claim 1, wherein the one or more adaptive weighting candidates are derived, ranked or signaled using one or more neighboring reconstructed or predicted samples.

3. The method of claim 1, wherein the template area includes top M rows and left N columns of the reconstruction samples.

4. The method of claim 3, wherein the reconstruction samples of the template area comprise one or more combinations of top, left, and top-left neighboring reconstruction samples and combinations of top-right and bottom-left neighboring reconstruction samples.

5. The method of claim 1, wherein the one or more adaptive weighting candidates include {(a/N, (N−a)/N), where a/N is the weighting applied on an intra prediction block, and (N−a)/N is the weighting applied on an inter prediction block.

6. The method of claim 1, wherein the cost value is used to calculate a ranked index of the one or more adaptive weighting candidates, and the ranked index is signaled in a bitstream to identify which weighting is applied for encoding.

7. The method of claim 1, wherein the one or more adaptive weighting candidates are applied with constant weightings in the compound inter-intra prediction mode.

8. The method of claim 7, wherein the one or more adaptive weighting candidates are derived using a look-up table.

9. An apparatus comprising:
at least one memory configured to store computer program code;
at least one processor configured to access the computer program code and operate as instructed by the computer program code, the computer program code including:
receiving code configured to cause the at least one processor to receive a coded video bitstream that includes a current picture;
defining code configured to cause the at least one processor to define, for a block included in the current picture, a template area of neighboring reconstruction or prediction samples of the block;
applying code configured to cause the at least one processor to apply one or more adaptive weighting candidates to the template area to generate one or more prediction samples using a compound inter-intra prediction mode in which one or more wedge masks split the block into at least a first section and a second section, the first section is filled with intra predicted samples and the second section is filled with inter predicted samples;
calculating code configured to cause the at least one processor to calculate a cost value for each of the one or more adaptive weighting candidates;
selecting code configured to cause the at least one processor to select an adaptive weighting candidate from the one or more adaptive weighting candidates that provides a lowest cost as the weighting used for decoding the block; and
decoding code configured to cause the at least one processor to decode the block based on the selected adaptive weighting and the generated one or more prediction samples,
wherein the cost value is defined as a prediction error between (i) reconstruction samples in the template area, and (ii) the one or more prediction samples in the template area generated by weighted intra and inter prediction using the selected adaptive weighting candidate.

10. The apparatus according to claim 9, wherein the one or more adaptive weighting candidates are derived, ranked or signaled using one or more neighboring reconstructed or predicted samples.

11. The apparatus according to claim 9, wherein the template area includes top M rows and left N columns of the reconstruction samples.

12. The apparatus according to claim 11, wherein the reconstruction samples of the template area comprise combinations of top, left, and top-left neighboring reconstruction samples and combinations of top-right and bottom-left neighboring reconstruction samples.

13. The apparatus according to claim 9, wherein the one or more adaptive weighting candidates include {(a/N, (N−a)/N), where a/N is the weighting applied on an intra prediction block, and (N−a)/N is the weighting applied on an inter prediction block.

14. The apparatus according to claim 9, wherein the cost value is used to calculate a ranked index of the one or more adaptive weighting candidates, and the ranked index is signaled in a bitstream to identify which weighting is applied for encoding.

15. The apparatus according to claim 9, wherein the one or more adaptive weighting candidates are applied with constant weightings in compound inter-intra prediction modes.

16. The apparatus according to claim 15, wherein the one or more adaptive weighting candidates are derived using a look-up table.

17. A non-transitory computer readable medium having stored thereon computer instructions that when executed by at least one processor cause the at least one processor to:
receive a coded video bitstream that includes a current picture;
define, for a block included in the current picture, a template area of neighboring reconstruction or prediction samples of the block;
apply one or more adaptive weighting candidates to the template area to generate one or more prediction samples using a compound inter-intra prediction mode in which one or more wedge masks split the block into at least a first section and a second section, the first section is filled with intra predicted samples and the second section is filled with inter predicted samples;
calculate a cost value for each of the one or more adaptive weighting candidates;
select an adaptive weighting candidate from the one or more adaptive weighting candidates that provides a lowest cost as the weighting used for decoding the block; and
decode the block based on the selected adaptive weighting and the generated one or more prediction samples,
wherein the cost value is defined as a prediction error between (i) reconstruction samples in the template area, and (ii) the one or more prediction samples in the template area generated by weighted intra and inter prediction using the selected adaptive weighting candidate.

18. The non-transitory computer readable medium according to claim 17, wherein the one or more adaptive weighting candidates are derived, ranked or signaled using one or more neighboring reconstructed or predicted samples.

* * * * *